Patented Apr. 5, 1932                                     1,852,108

UNITED STATES PATENT OFFICE

LUDWIG J. CHRISTMANN, OF JERSEY CITY, AND GODFREY B. WALKER, OF ROSELLE, NEW JERSEY, ASSIGNORS TO AMERICAN CYANAMID COMPANY, OF NEW YORK, N. Y., A CORPORATION OF MAINE

FROTH FLOTATION OF ORES

No Drawing.        Application filed December 13, 1929.   Serial No. 413,929.

This invention relates to a method of recovering minerals from ores, including sulphide and oxide ores, by subjecting the same to a flotation operation in the presence of a certain class of flotation promoting reagents.

We have found that recoveries of the values from copper, lead, and zinc ores may be had when the same are subjected to flotation operations in the presence of the class of promoter reagents of which 4 phenyl 5 thioketo 2 mercapto 1:3:4 thiodiazole is a type. The reagent may be prepared according to the directions give in Berichte 27, page 2510.

The class of compounds constituting the subject matter of this invention may be represented by the following structural formula:

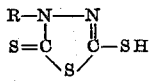

where R is an aryl or alkyl group, such as phenyl, naphthyl, tolyl, ethyl, etc. The H may be replaced by an alkaline group, such as sodium, potassium, ammonium, etc.

As illustrating the recoveries which may be expected from copper ores, one showing the following analysis was chosen.

|  | Per cent |
|---|---|
| Total copper | 4.60 |
| Oxide copper | 0.02 |
| Iron | 20.2 |
| Arsenic | 0.34 |
| Insoluble | 69.40 |

This ore was stage crushed to minus ten mesh and then ground in a steel rod mill at one to one dilution with 4.0 lbs. of lime per ton of ore for a twenty-two minute period. The pH of the resulting pulp showed 10.1. A float was run in a subaerated flotation machine with a pulp density of 22% solids. 4 phenyl 5 thioketo 2 mercapto 1:3:4 thiodiazole was used in an amount equivalent to 0.0125 lbs. per ton of ore together with 0.06 lbs. of pine oil per ton of ore as a frother. One minute was allowed for agitation before air was admitted. A concentrate was floated for three minutes after which a middling was floated for seven minutes. The concentrate contained 94.7% of the copper and the middling 2%, giving a total copper recovery of 96.7%.

A similar operation was conducted on a zinc ore which analyzed as follows:

|  | Per cent |
|---|---|
| Zinc (sulphide) | 3.00 |
| Iron | 1.39 |
| Insoluble | 8.6 |
| Calcium oxide | 28.85 |
| Magnesium oxide | 16.36 |

The ore was stage crushed to minus twenty mesh and then ground in a steel rod mill at one to one dilution for a five minute period. The resulting pulp showed a pH of 8.0. The pulp was transferred to a laboratory flotation machine of the agitation type and diluted to 22% solids. 0.1 lbs. of the above reagent per ton of ore together with 1.0 lbs. of copper sulphate and 0.12 lbs. of pine oil per ton were added to the machine. One minute was allowed for agitation and then a concentrate was removed for three minutes, followed by a middling for four minutes. The same quantity of pine oil as above was added to the middling float. 84.6% of the zinc was recovered in the concentrate and 3.4% in the middling, giving a total zinc recovery of 88%.

A float was also conducted with a lead ore using the same reagent. The ore analyzed as follows:

|  | Per cent |
|---|---|
| Lead (sulphide) | 1.86 |
| Zinc | Trace |
| Iron | 4.96 |
| Insoluble | 6.70 |
| Calcium oxide | 26.94 |
| Magnesium oxide | 13.16 |

The ore was stage crushed to minus twenty mesh and then ground in a steel rod mill at one to one dilution for a five minute period. The resulting pulp showed a pH of 8.0. After grinding, the pulp was transferred to a flotation machine where 0.05 lbs. of 4 phenyl 5 thioketo 2 mercapto 1:3:4 thiodiazole and 0.06 lbs. of pine oil per ton of ore were added. The pulp density was 22% solids. One minute was allowed for agitation and a concentrate floated for a four minute period.

As a result of this operation 68.0% of the lead was recovered in the concentrate.

While certain ores and reagents have been enumerated in the above description, yet it is to be understood that we do not wish to be limited specifically thereto, as these substances have been mentioned as typical of a class and the invention is to be construed broadly and restricted only by the scope of the claims.

We claim:—

1. A method of recovering minerals from ores which comprises subjecting said ores to a froth flotation operation in the presence of 4 phenyl 5 thioketo 2 mercapto 1:3:4 thiodiazole as a promoter.

2. A method of recovering minerals from ores which comprises subjecting said ores to a froth flotation operation in the presence of a promoter having the following structural formula:

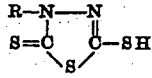

where R is an aryl or alkyl group and H may be replaced by an alkaline group.

In testimony whereof, we have hereunto subscribed our names this 11th day of December, 1929.

LUDWIG J. CHRISTMANN.
GODFREY B. WALKER.